United States Patent
Maeno et al.

(10) Patent No.: US 6,962,652 B2
(45) Date of Patent: Nov. 8, 2005

(54) SKIN-CARE LIQUID PREPARING UNIT

(75) Inventors: Yoshihiro Maeno, Settsu (JP); Rie Nakata, Amagasaki (JP)

(73) Assignee: Suisei Kogyo Co., Ltd., Amagasaki (JP)

( * ) Notice: Subject to any disclaimer, the term of this patent is extended or adjusted under 35 U.S.C. 154(b) by 82 days.

(21) Appl. No.: 10/093,474

(22) Filed: Mar. 11, 2002

(65) Prior Publication Data
US 2003/0168395 A1 Sep. 11, 2003

(51) Int. Cl.[7] .................................................. C02F 9/00
(52) U.S. Cl. ........................ 210/94; 210/266; 210/282; 210/283; 222/190
(58) Field of Search .......................... 210/94, 266, 282, 210/283, 284, 251; 222/190, 192

(56) References Cited

U.S. PATENT DOCUMENTS 3,985,648 A * 10/1976 Casolo ........................ 210/669
4,196,081 A * 4/1980 Pavia ............................ 210/94

FOREIGN PATENT DOCUMENTS

| JP | 51-3649 | 2/1976 |
|---|---|---|
| JP | 8-52469 | 2/1996 |
| JP | 9-248560 | 9/1997 |
| JP | 2989150 | 10/1999 |

* cited by examiner

Primary Examiner—Ivars C. Cintins
(74) Attorney, Agent, or Firm—Bacon & Thomas

(57) ABSTRACT

The invention provides a skin-care liquid preparing unit comprising: a main container which contains raw water; a cartridge container which is placed in the main container, and which contains different kinds of cation exchange resins; and a sprayer which is attached to an upper end mouth portion of the main container, and which has a suction pipe connected to an upper portion of the cartridge container. The unit is configured so as to pass the raw water in the main container through the cartridge container from a lower portion of the cartridge container and spray the water from the spray. In the unit, in order to easily prepare skin-care liquid of a pH value that is useflil for moisture retention and health of the skin, an Na type or K type cation exchange resin layer and an H type cation exchange resin layer are formed to be arranged in upper and lower positions in the cartridge container.

8 Claims, 4 Drawing Sheets

SKIN-CARE LIQUID PREPARING UNIT

BACKGROUND OF THE INVENTION

1. Field of the Invention

The present invention relates to a skin-care liquid preparing unit in which raw water such as service water passes through cation exchange resins to prepare skin-care liquid consisting of slightly acidic soft water that is useful for moisture retention and health of the skin.

2. Description of the Prior Art

A skin-care liquid preparing unit in which service water passes through a cation exchange resin to prepare soft water that is useful for moisture retention and health of the skin of the human body is proposed in, for example, Japanese Patent No. 2,989,150. FIG. 4 shows one of skin-care liquid preparing units which are disclosed in the patent. The unit comprises: a main container 2 which contains raw water 1; a cartridge container 3 which contains a cation exchange resin; and a sprayer 4 which is attached to an upper end mouth of the cartridge container 3, and which has a suction pipe 17 connected to an upper portion of the cartridge container 3, and is configured so that the raw water 1 in the main container 2 passes through the cartridge container 3 from its lower portion and then sprayed from the sprayer 4.

The interior of the cartridge container 3 is partitioned by a partition plate 30 in parallel of the flow direction of the raw water 1 to form a first tubular container portion 31 and a second tubular container portion 32. An Na type or K type cation exchange resin is packed into the first tubular container portion 31 to form an Na type or K type cation exchange resin layer 33, and an H type cation exchange resin is packed into the second tubular container portion 32 to form an H type cation exchange resin layer 34.

When the sprayer 4 is depressed, the raw water 1 in the main container 2 passes through the cartridge container 3 with being branched into the Na type or K type cation exchange resin layer 33 and the H type cation exchange resin layer 34, so that hard ions such as calcium ions and magnesium ions existing in the raw water 1 are exchanged with soft ions such as Na ions or K ions in the Na type or K type cation exchange resin layer 33, and exchanged with H ions in the H type cation exchange resin layer 34. Thereafter, the two kinds of ion-exchanged soft water are mixed with each other with passing through activated carbon 35, a sintered filter 36, and a bacteriostatic filter layer 37. The mixed water passes through a suction pipe 18 in the suction pipe 17 and is then sprayed from a nozzle 19b at the tip end of the sprayer 4.

In the skin-care liquid preparing unit in which the raw water 1 is processed with passing through the Na type or K type cation exchange resin layer 33 and the H type cation exchange resin layer 34 in a parallel manner, however, soft water only is obtained, and slightly acidic soft water is hardly obtained which is similar in pH to the skin and hair and less stimulating, and which seems to be good for beauty.

This will be specifically described. In the raw water which passes through the H type cation exchange resin layer 34, cations such as calcium ions in the raw water are exchanged with hydrogen ions existing in the cation exchange resin layer 34 to soften the water, and at the same time hydrogen ions are increased. Therefore, the water is made strongly acid. In the raw water which passes through the Na type or K type cation exchange resin layer 33, cations such as calcium ions in the raw water are exchanged with sodium ions, potassium ions, or the like existing in the cation exchange resin layer 33, and sodium ions or potassium ions is increased in the water. Therefore, soft water is obtained. However, the water is not made slightly acid because hydrogen ions are not increased. As a result, by the skin-care liquid preparing unit in which the raw water is processed with passing in parallel through the Na type or K type cation exchange resin layer 33 and the H type cation exchange resin layer 34 that are juxtaposed, soft water can be obtained, but slightly acidic soft water is hardly obtained which seems to be good for beauty.

Since an Na type or K type cation exchange resin is different in grain size and density from an H type cation exchange resin, the speed at which the raw water passes through the Na type or K type cation exchange resin layer is different from that at which the raw water passes through the H type cation exchange resin layer, so that the raw water cannot pass through the two layers at the same speed. Even when the raw water 1 passes through the Na type or K type cation exchange resin layer 33 and the H type cation exchange resin layer 34 in parallel and then subjected to a mixing process, therefore, it is impossible to obtain a stable pH value.

SUMMARY OF THE INVENTION

In view of these problems, it is an object of the invention to provide a skin-care liquid preparing unit in which raw water such as service water passes through different kinds of cation exchange resins to prepare skin-care liquid consisting of slightly acidic soft water. It is another object of the invention to provide a skin-care liquid preparing unit in which the combination and arrangement of different kinds of cation exchange resins are devised so that skin-care liquid consisting of slightly acidic soft water which always has a stable pH value can be easily prepared irrespective of the quality of raw water.

According to the invention, in a skin-care liquid preparing unit comprising: a main container which contains raw water; a cartridge container which is placed in the main container, and which contains different kinds of cation exchange resins; and a sprayer which is attached to an upper end mouth portion of the main container, and which has a suction pipe connected to an upper portion of the cartridge container, the unit being configured to pass the raw water in the main container through the cartridge container from a lower portion of the cartridge container and spray the water from the sprayer, an Na type or K type cation exchange resin layer and an H type cation exchange resin layer are formed into two or more vertically arranged layers in the cartridge container, a lowermost one of the layers is configured by an H type cation exchange resin layer, and an uppermost one of the layers is configured by an Na type or K type cation exchange resin layer.

In the skin-care liquid preparing unit, when raw water is entered into the cartridge container from its lower portion, the raw water passes through the H type cation exchange resin layer, and then passes through the Na type or K type cation exchange resin layer. The raw water first passes through the H type cation exchange resin layer. At the same time when cations such as calcium ions and magnesium ions in the raw water are exchanged with hydrogen ions existing in the cation exchange resin layer to soften the water, therefore, hydrogen ions are increased, so that the water is made strongly acid. Then, the strongly acidic water passes through the Na type or K type cation exchange resin layer, whereby cations such as calcium ions and magnesium ions in the water are exchanged with sodium ions, potassium ions, or the like existing in the cation exchange resin layer, and at the same time excess hydrogen ions are exchanged with cations such as sodium ions or potassium ions. As a result, the water is neutralized to become slightly acidic water, so that slightly acidic skin-care liquid which is less stimulating to the skin and hair, and which is good for beauty can be obtained.

When the Na type or K type cation exchange resin layer and the H type cation exchange resin layer are arranged in a vertically serial manner, the raw water passes through the ion exchange resin layers at the same speed. Therefore, slightly acidic soft water of a stable pH value can be obtained.

In the skin-care liquid preparing unit of the invention, the above-mentioned skin-care liquid preparing unit may be configured so that an activated carbon layer is disposed below the lowermost H type cation exchange resin layer. In this skin-care liquid preparing unit, before raw water configured by service water passes through the lowermost H type cation exchange resin layer, sterilizing chlorine contained in the service water is removed by the activated carbon layer. Therefore, the resulting water is suitable for skin-care liquid, and the cation exchange resin layer can be prevented from being deteriorated by the chlorine.

In the skin-care liquid preparing unit of the invention, the above-mentioned skin-care liquid preparing unit may be configured so that a sintered filter is interposed between the Na type or K type cation exchange resin layer and the H type cation exchange resin layer. In this skin-care liquid preparing unit, an Na type or K type cation exchange resin and an H type cation exchange resin are separated from each other by the sintered filter, whereby the resins are prevented from being mixed with each other.

In the skin-care liquid preparing unit of the invention, the above-mentioned skin-care liquid preparing unit may be configured so that a bacteriostatic filter is disposed via a sintered filter above the uppermost Na type or K type cation exchange resin layer. In this skin-care liquid preparing unit, bacteria are prevented from being generated in the slightly acidic soft water which has not yet been sprayed.

The total hardness of raw water is varied depending on the region. In the skin-care liquid preparing unit, therefore, it is preferable to adequately adjust the volume ratio of the H type cation exchange resin layer in accordance with the total hardness of raw water, from the viewpoint of obtaining slightly acidic water for skin-care liquid. In order to reduce the frequency of the adjustment and make the unit cope with a larger number of regions, the volume ratio of the H type cation exchange resin layer is preferably set to 20 to 50%, and more preferably to 20 to 30%.

In the case where the volume ratio of the H type cation exchange resin layer is smaller than 20%, even when cations such as calcium ions in the raw water are exchanged with hydrogen ions existing in the H type cation exchange resin layer, hydrogen ions are not increased, and hence the pH value is not largely reduced. In the case where the volume ratio is larger than 50%, when cations such as calcium ions in the raw water are exchanged with hydrogen ions existing in the H type cation exchange resin layer, hydrogen ions are excessively increased, and hence the pH value is largely reduced. In order to reduce the frequency of the adjustment of the volume ratio of the H type cation exchange resin layer in accordance with the total hardness of raw water which is varied depending on the region in a process of adjusting the pH value to a value of about 4 to 6 (slightly acidic water) which is similar to the target pH value of the skin and hair of a man, and to make the unit cope with a larger number of regions, therefore, the volume ratio of the H type cation exchange resin layer is preferably set to 20 to 50%, and more preferably to 20 to 30%.

In the skin-care liquid preparing unit of the invention, the above-mentioned skin-care liquid preparing unit may be configured so that the main container and the cartridge container are formed by a transparent material, and the H type cation exchange resin layer is colored by an indicator dye. In this skin-care liquid preparing unit, the limitation of the ability (life) of the cation exchange resin can be known at a glance from a change of color of the H type cation exchange resin layer.

DESCRIPTION OF THE PREFERRED
EMBODIMENTS OF THE INVENTION

Figure 1:
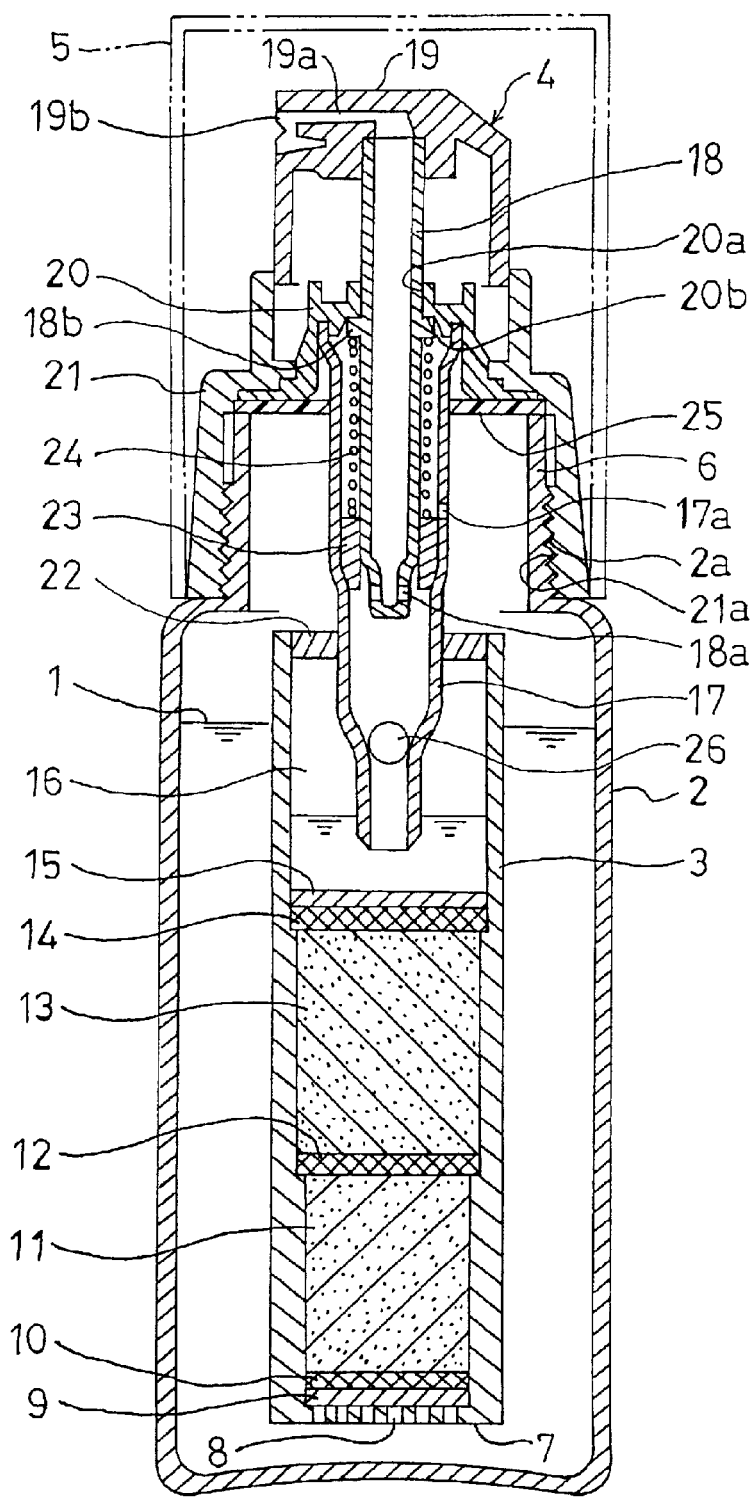
FIG. 1 is a section view of an embodiment of the skin-care liquid preparing unit.

An embodiment of the invention will be described with reference to FIG. 1. The skin-care liquid preparing unit of the invention comprises: a main container 2 which is made of a resin having translucency or transparent glass, and which contains raw water 1 such as service water: a cartridge container 3 which is placed in the main container 2, and which contains different kinds of cation exchange resins; a sprayer 4 which is detachably attached to the main container 2; and a cap 5 which covers the spray 4.

The cartridge container 3 is made of a resin having translucency or transparent glass in the same manner as the main container 2, and formed into a bottomed cylindrical shape the diameter of which is smaller than the inner diameter of an upper end mouth portion 6 of the main container 2. The cartridge container is placed so that the bottom 7 is positioned in the vicinity of the inner bottom face of the main container 2. Inflow holes 8 for the raw water 1 are formed in the bottom 7 of the cartridge container 3. In the cartridge container 3, an activated carbon layer 9, a sintered filter 10, an H type cation exchange resin layer 11, a sintered filter 12, an Na type or K type cation exchange resin layer 13, a sintered filter 14, and a bacteriostatic filter layer 15 are sequentially disposed. A water reservoir chamber 16 is disposed above the bacteriostatic filter layer 15.

The activated carbon layer 9 is configured by fibrous activated carbon. The bacteriostatic filter layer 15 is configured by optical semiconductor nonwoven fabric in which optical semiconductor ceramics having an optical energy converting function to decompose organic materials is fixed to a microporous substrate made of nonwoven fabric of inorganic fibers.

The sprayer 4 is a sprayer of the well-known direct compression type and configured by a suction pipe 17, an extraction pipe 18, a head member 19, a bearing member 20, and an attachment member 21.

A lower portion of the suction pipe 17 is coupled integrally to the cartridge container 3 via a coupling member 22 made of a cartridge seal member. In the suction pipe 17, an air hole 17a is formed in an upper part of a portion connected with the coupling member 22, the diameter of a lower end portion positioned in the water reservoir chamber 16 is reduced, and a check ball valve 26 is housed in an upper part of the diameter-reduced portion.

The extraction pipe 18 is configured by a pipe member which is inserted into the suction pipe 17 so as to be vertically movable along the axis of the pipe. In the extraction pipe 18, water supply holes 18a are formed in the side face of a lower end closed portion, and a flange 18b for locking is formed in a substantially middle portion. A seal member 23 which seals a gap between a lower portion of the extraction pipe 18 and the inner peripheral face of the suction pipe 17 is attached to the lower portion. A spring 24 is placed above the seal member 23 so that the extraction pipe 18 is always upward urged by the spring 24.

The head member 19 is attached to an upper end portion of the extraction pipe 18. In the head member, a water flow path 19a which communicates with a hollow portion of the extraction pipe 18 is disposed, and a nozzle 19b which sprays the water in mist form is formed in the tip end of the water flow path 19a.

The extraction pipe 18 is passed through and held by a through hole 20a in the axial center of the bearing member 20 so as to be vertically movable. An upper portion of the suction pipe 17 is held by the bearing member, so that the cartridge container 3 is integrally held via the suction pipe 17. An engaging portion 20b which is to be engaged with the flange 18b is disposed on the bearing member 20.

The attachment member 21 is used for positioning and attaching the bearing member 20 onto the mouth portion 6 of the main container 2. An internal thread portion 21a which is to be screwed with an external thread portion 2a formed in an outer peripheral face of an upper portion of the main container 2 is formed in an inner peripheral face of the lower end of the attachment member. A packing 25 for sealing is placed between the bearing member 20 and the main container 2.

The thus configured skin-care liquid preparing unit is used in the following manner. The sprayer 4 is detached from the main container 2, and service water which is easily available in a general home is then poured into the main container 2, as the raw water 1. Thereafter, the sprayer 4 is again attached to the container, and the head member 19 of the sprayer 4 is then downward depressed. As a result, the extraction pipe 18 is integrally lowered, and the air between the head member 19 and the attachment member 21 is compressed into the suction pipe 17 with passing through the gap between the extraction pipe 18 and the bearing member 20, and then supplied into the main container 2 with passing through the air hole 17a of the suction pipe 17.

When the air is supplied into the main container 2 in this way, the pressure of the air causes the raw water 1 in the main container 2 to flow into the cartridge container 3 from the inflow holes 8 of the bottom 7 of the cartridge container 3 via the activated carbon layer 9 and the sintered filter 10. During this process, when the raw water 1 contains sterilizing chlorine, the chlorine is removed by the activated carbon layer 9. Foreign materials in the raw water 1 are removed by the sintered filter 10.

Then, the raw water 1 is upward moved with passing through the H type cation exchange resin layer 11. During this process, cations such as calcium ions and magnesium ions contained in the raw water 1 are exchanged with hydrogen ions existing in the cation exchange resin layer 11 to soften the water. At the same time, hydrogen ions are increased, and hence the water becomes strongly acidic water. Then, the strongly acidic soft water passes through the Na type or K type cation exchange resin layer 13, whereby cations such as calcium ions and magnesium ions in the water are exchanged with sodium ions, potassium ions, or the like existing in the cation exchange resin layer 13, and at the same time excess hydrogen ions are exchanged with cations such as sodium ions or potassium ions. Therefore, the water is neutralized to become slightly acidic water.

During this process, the raw water 1 passes through the H type cation exchange resin layer 11 at the same speed. After this passage, the water passes through also the Na type or K type cation exchange resin layer 13 at the same speed. Therefore, slightly acidic water of a stable pH value can be obtained.

Thereafter, the thus prepared slightly acidic soft water passes through the sintered filter 14 and the bacteriostatic filter layer 15 to flow into the water reservoir chamber 16. During this process, when foreign materials remain to exist in the slightly acidic soft water, the foreign materials are again removed by the sintered filter 14. In the case where bacteria are generated, the bacteria are sterilized by the bacteriostatic filter layer 15. Furthermore, the activity of microorganisms which may enter the cartridge container 3 from the outside via the nozzle 19b of the head member 19 can be eliminated.

When the slightly acidic soft water is prepared as skin-care liquid and then flown into the water reservoir chamber 16, the water is sucked by the suction pipe 17 of the sprayer 4 to flow into the suction pipe 17 while upward lifting the check ball valve 26. Thereafter, the skin-care liquid flows into the extraction pipe 18 from the water supply holes 18a of the extraction pipe 18 which is inserted into the suction pipe 17. The skin-care liquid further rises in the extraction pipe 18 to pass through the water flow path 19a of the head member 19, and is then sprayed in mist form from the nozzle 19b at the tip end. When the raw water 1 in the main container 2 is exhausted, the raw water 1 can be again supplied into the main container 2 to allow the unit to be reused.

As the cation exchange resin constituting the H type cation exchange resin layer 11, used is a cation exchange resin in which the limitation of the ability (life) can be judged in accordance with the color. Therefore, the H type cation exchange resin is colored by an indicator dye. As the indicator dye, thymol red is used. Thymol red is a dye which is faded by a hardness component, and in which the original color is lost in accordance with exchange and emission of an H component in an exchange site of the H type cation exchange resin with the hardness component. This fading occurs with starting from a lower portion of the H type cation exchange resin layer 11 in accordance with the passage of the raw water. Therefore, the user can judge at a glance whether the H type cation exchange resin layer 11 reaches the limitation of the ion exchange ability, depending on the color change state of the resin layer which can be observed through the main container 2 and the cartridge container 3 that are transparent.

Next, preferred volume ratios of the Na type or K type cation exchange resin layer 13 and the H type cation exchange resin layer 11 which are vertically arranged in this way will be described. The skin-care liquid to be prepared is aimed at slightly acidic water of a pH value of about 4 to 6 which is similar to that of the skin and hair of a man. In order to attain the object, the volume ratio of the H type cation exchange resin layer 11 is set to 20 to 50%, and that of the Na type or K type cation exchange resin layer 13 to 50 to 80%. More preferably, the volume ratio of the H type cation exchange resin layer 11 is set to 20 to 30%, and that of the Na type or K type cation exchange resin layer 13 to 70 to 80%.

In the case where the volume ratio of the H type cation exchange resin layer 11 is smaller than 20% and that of the Na type or K type cation exchange resin layer 13 is larger than 80%, even when cations such as calcium ions in the raw water are exchanged with hydrogen ions existing in the H type cation exchange resin layer 11, hydrogen ions are not increased, and hence the pH value is not largely reduced. In the case where the volume ratio of the H type cation exchange resin layer 11 is larger than 50% and that of the Na type or K type cation exchange resin layer 13 is smaller than 50%, when cations such as calcium ions in the raw water are exchanged with hydrogen ions existing in the H type cation exchange resin layer 11, hydrogen ions are excessively increased, and hence the pH value is largely reduced. Therefore, it is preferable to set the volume ratios of the H type cation exchange resin layer 11 and the Na type or K type cation exchange resin layer 13 to be within the above-mentioned value range.

The total hardness (mg/L) of raw water such as service water is varied depending on the region (average total hardness (mg/L): 60). Therefore, the pH value of skin-care liquid prepared from such raw water is varied. It is desirable that skin-care liquid always be slightly acidic at a desired pH value. It is not preferable that the pH value of skin-care liquid is varied depending on the region.

Figure 2:
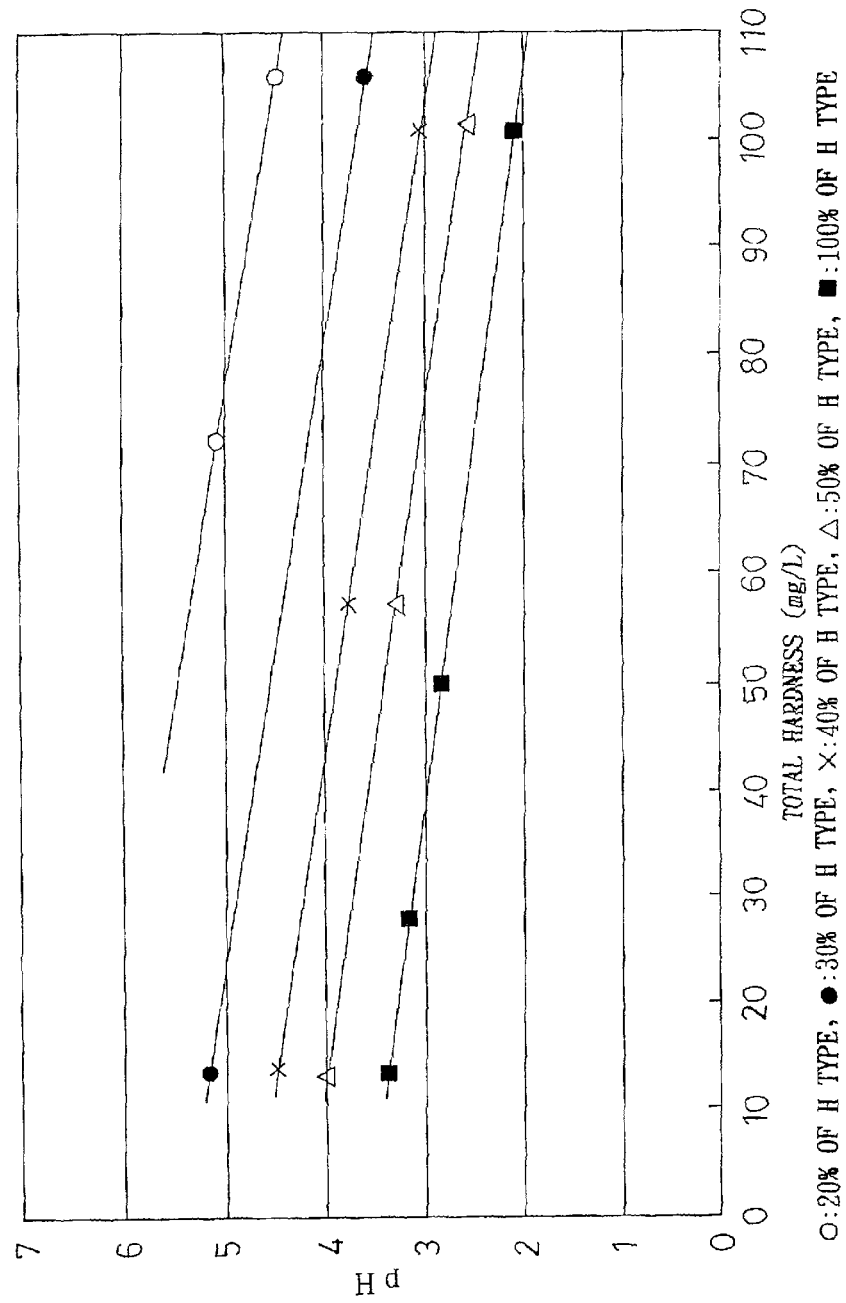
FIG. 2 is a graph showing relationships between the total hardness of raw water and the pH value after preparation.

Even in the case where the total hardness (mg/L) of raw water is varied depending on the region as described above, when, in the volume ratios of the Na type or K type cation exchange resin layer 13 and the H type cation exchange resin layer 11 which are vertically arranged, the volume ratio of the H type cation exchange resin layer 11 is set to 20 to 50%, more preferably to 20 to 30%, slightly acidic skin-care liquid of a desired pH value can be prepared in a larger number of regions. This can be ascertained from the experimental results shown in FIG. 2. FIG. 2 is a graph showing relationships between the total hardness of raw water and the pH value of water which has passed through the cartridge container 3. From the graph, the followings will be seen. In the case where the volume ratio of the H type cation exchange resin layer 11 is set to 20%, when the total hardness of service water is in a range of 40 to 110 (mg/L), slightly acidic water of a desired pH value of about 4 to 5.5 can be prepared. In the case where the volume ratio of the H type cation exchange resin layer 11 is set to 30%, when the total hardness of service water is in a range of 10 to 80 (mg/L), slightly acidic water of a desired pH value of about 4 to 5.5 can be prepared. In the case where the volume ratio of the H type cation exchange resin layer 11 is set to 40%, when the total hardness of service water is in a range of 10 to 40 (mg/L), slightly acidic water of a desired pH value of about 4 to 5.5 can be prepared. In the case where the volume ratio of the H type cation exchange resin layer 11 is set to 50%, when the total hardness of service water is about 10 (mg/L), slightly acidic water of a desired pH value of about 4 can be prepared. It was found that, in the case where the volume ratio of the H type cation exchange resin layer 11 is set to 100%, only strongly acidic water of a pH value smaller than 4 is obtained at any total hardness.

Figure 3:
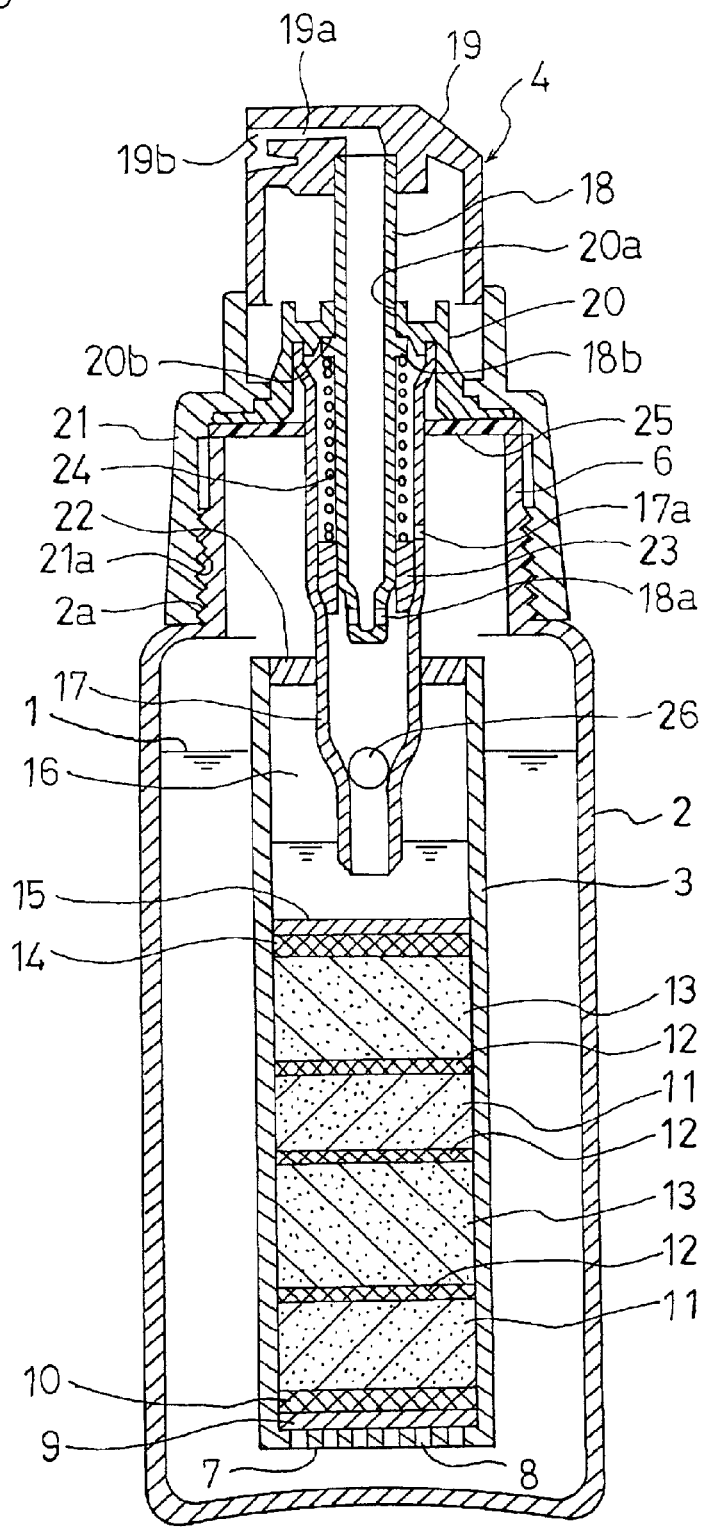
FIG. 3 is a section view of another embodiment of the skin-care liquid preparing unit.
Figure 4:
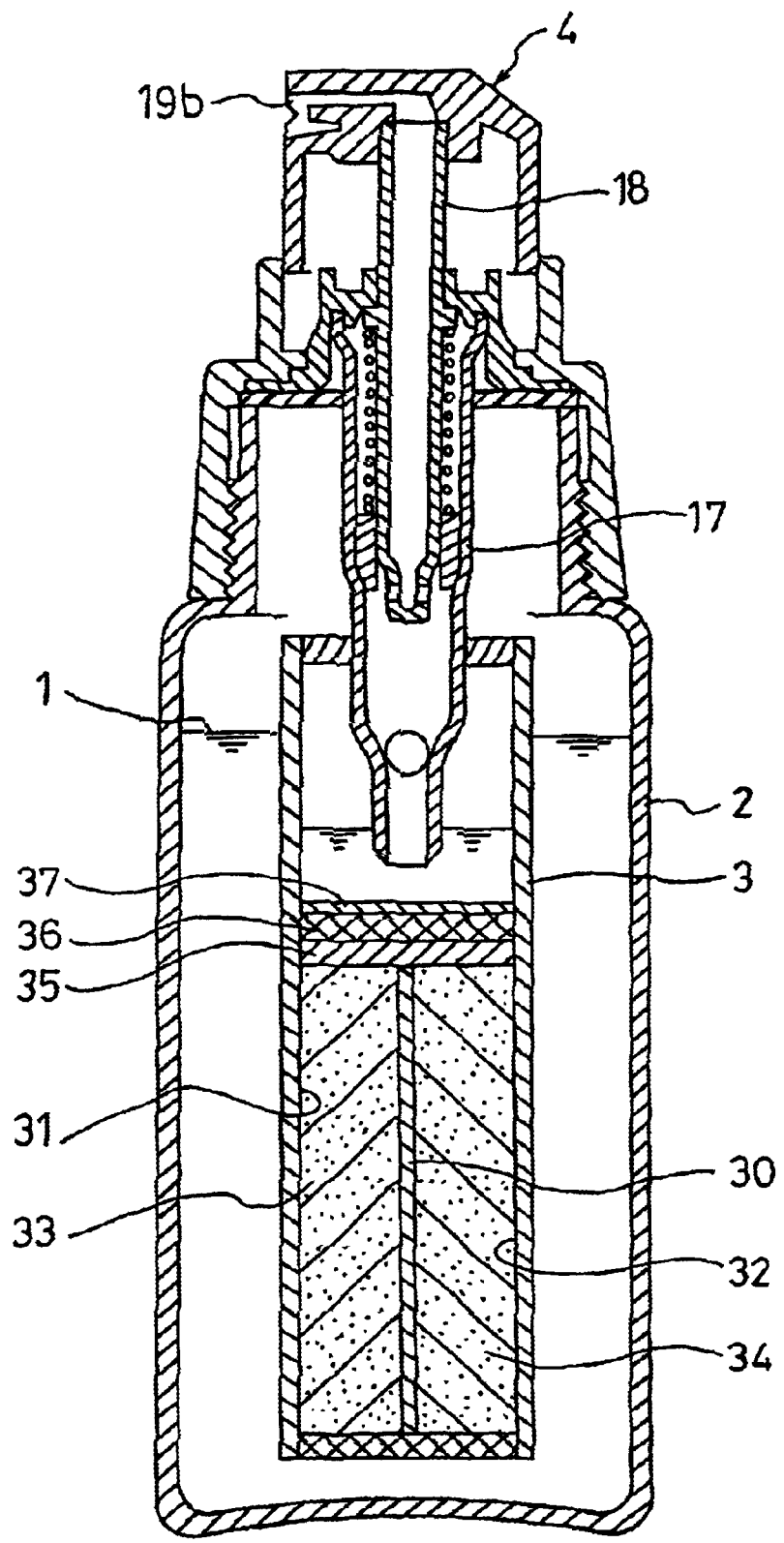
FIG. 4 is a section view of a skin-care liquid preparing unit of a conventional art example.

In the embodiment, the Na type or K type cation exchange resin layer 13 and the H type cation exchange resin layer 11 are arranged so as to configure a vertical two-layer structure in the cartridge container 3. The invention is not restricted to this configuration. As shown in FIG. 3, the Na type or K type cation exchange resin layer 13 and the H type cation exchange resin layer 11 may be alternately arranged via sintered filters 12 so as to configure a vertical layer structure consisting of four or more (plural) layers. In the alternative, it is essential to position the H type cation exchange resin layer 11 at the lowermost layer, and the Na type or K type cation exchange resin layer 13 at the uppermost layer. The activated carbon layer 9 is disposed via the sintered filter 10 below the lowermost H type cation exchange resin layer 11. The bacteriostatic filter layer 15 is disposed via the sintered filter 14 above the uppermost Na type or K type cation exchange resin layer 13.

Alternatively, the sprayer 4 may be of the pressure accumulation type, or may be of any type as far as it allows the raw water in the main container 2 to be sprayed to the outside through the cartridge container 3. The material of the bacteriostatic filter layer 15 is not restricted to optical semi-conductor nonwoven fabric, and the filter layer may be configured by packing a granular resin containing an antibacterial agent.

What is claimed is:

1. A skin-care liquid preparing unit comprising: a main container which contains raw water; a cartridge container which is placed in said main container, and which contains different kinds of cation exchange resins; and a sprayer which is attached to an upper end mouth portion of said main container, and which has a suction pipe connected to an upper portion of said cartridge container, said skin-care liquid preparing unit being configured to pass the raw water in said main container through said cartridge container from a lower portion of said cartridge container and spray the water from said sprayer, wherein an Na type or K type cation exchange resin layer and an H type cation exchange resin layer are formed into two or more vertically arranged layers in said cartridge container, a lowermost one of said layers is configured by said H type cation exchange resin layer, and an uppermost one of said layers is configured by said Na type or K type cation exchange resin layer.

2. A skin-care liquid preparing unit according to claim 1, wherein an activated carbon layer is disposed below said lowermost H type cation exchange resin layer in said cartridge container.

3. A skin-care liquid preparing unit according to claim 2, wherein a sintered filter is interposed between said H type cation exchange resin layer and said Na type or K type cation exchange resin layer.

4. A skin-care liquid preparing unit according to claim 3, wherein a bacteriostatic filter is separated from and disposed above said uppermost Na type or K type cation exchange resin layer by a sintered filter.

5. A skin-care liquid preparing unit according to claim 1, wherein a volume ratio of said H type cation exchange resin layer is 20 to 50%, and a volume ratio of said Na type or K type cation exchange resin layer is 50 to 80%.

6. A skin-care liquid preparing unit according to claim 1, wherein a volume ratio of said H type cation exchange resin layer is 20 to 30%, and a volume ratio of said Na type or K type cation exchange resin layer is 70 to 80%.

7. A skin-care liquid preparing unit according to claim 1, wherein said main container and said cartridge container are formed by a transparent material, and said H type cation exchange resin layer is colored by an indicator dye.

8. A skin-care liquid preparing unit comprising: a main container which contains raw water; a cartridge container which is placed in said main container, and which contains different kinds of cation exchange resins; and a sprayer which is detachably attached to an upper end mouth portion of said main container, and which has a suction pipe connected to an upper portion of said cartridge container, said skin-care liquid preparing unit being configured to pass the raw water in said main container through said cartridge container from a lower portion of said cartridge container and spray the water from said sprayer, wherein an Na type or K type cation exchange resin layer is formed and arranged to be the uppermost ion exchange resin layer and an H type cation exchange resin layer is formed and arranged to be the lowermost ion exchange resin layer in said cartridge container, a sintered filter is interposed between said upper Na type or K type cation exchange resin layer and said lower H type cation exchange resin layer, an activated carbon layer is separated from and disposed below said lower H type cation exchange resin layer by a sintered filter, and a bacteriostatic filter is separated from and disposed above said upper Na type or K type cation exchange resin layer by a sintered filter.

* * * * *